United States Patent
Ogawa et al.

(10) Patent No.: US 7,290,521 B2
(45) Date of Patent: Nov. 6, 2007

(54) CONTROL SYSTEM FOR COMPRESSION-IGNITION ENGINE

(75) Inventors: Ken Ogawa, Wako (JP); Toru Kitamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/498,172

(22) Filed: Aug. 3, 2006

(65) Prior Publication Data

US 2007/0028889 A1 Feb. 8, 2007

(30) Foreign Application Priority Data

Aug. 4, 2005 (JP) ............................ 2005-226955
Aug. 4, 2005 (JP) ............................ 2005-226956

(51) Int. Cl.
*F02B 11/00* (2006.01)
(52) U.S. Cl. ...................................... 123/299; 123/305
(58) Field of Classification Search ................ 123/295, 123/299, 305
See application file for complete search history.

(56) References Cited

U.S. PATENT DOCUMENTS

| | | | |
|---|---|---|---|
| 6,386,174 B1 * | 5/2002 | Volz et al. ................. | 123/295 |
| 6,390,055 B1 * | 5/2002 | Sivashankar et al. ....... | 123/295 |
| 6,631,704 B2 * | 10/2003 | Ogawa et al. .............. | 123/299 |
| 6,705,276 B1 * | 3/2004 | Sun et al. .................. | 123/295 |
| 7,104,248 B2 * | 9/2006 | Weiss ........................ | 123/305 |

FOREIGN PATENT DOCUMENTS

JP 2000-087749 A 3/2000

* cited by examiner

*Primary Examiner*—Erick Solis
(74) *Attorney, Agent, or Firm*—Arent Fox LLP (57) ABSTRACT

In a control system for a compression-ignition engine whose operation is switchable between a compression-ignition operation in which an air-fuel mixture supplied to a combustion chamber auto-ignites to burn owing to compression and a spark-ignition operation in which the air-fuel mixture is ignited to burn by a spark of a spark plug, it is determined whether a predetermined prohibitive condition to prohibit switching from the spark-ignition to the compression-ignition operation is satisfied, and switching from the spark-ignition operation to the compression-ignition operation is prohibited when the predetermined prohibitive condition is satisfied, thereby enabling to avoid premature ignition and misfire and to prevent drivability and fuel consumption performance from being affected therefrom.

14 Claims, 9 Drawing Sheets

$$\Delta QCT = m \cdot Cp \cdot (TCT(k) - TCT(k-1))$$
$$= A \cdot h \cdot (TEX - TCT(k-1)) \cdot \Delta t \dots (1)$$

$$m \cdot Cp \cdot TCT(k) - m \cdot Cp \cdot TCT(k-1)$$
$$= A \cdot h \cdot TEX \cdot \Delta t - A \cdot h \cdot TCT(k-1) \cdot \Delta t \dots (2)$$

$$m \cdot Cp \cdot TCT(k)$$
$$= A \cdot h \cdot TEX \cdot \Delta t + (m \cdot Cp - A \cdot h \cdot \Delta t) \cdot TCT(k-1) \dots (3)$$

$$TCT(k) = \frac{1}{m \cdot Cp} [A \cdot h \cdot TEX \cdot \Delta t + (m \cdot Cp - A \cdot h \cdot \Delta t) \cdot TCT(k-1)] \dots (4)$$

$\begin{cases} \text{MASS } m & [\text{kg}] \\ \text{COEFFICIENT OF HEAT-TRANSFER } h & [\text{kcal/m}^2 \cdot {}^\circ\text{C} \cdot \text{hr}] \\ \text{CROSS-SECTIONAL AREA } A & [\text{m}^2] \\ \text{SPECIFIC HEAT } Cp & [\text{kcal/}{}^\circ\text{C} \cdot \text{kg}] \end{cases}$

FIG. 11

CONTROL SYSTEM FOR COMPRESSION-IGNITION ENGINE

BACKGROUND OF THE INVENTION

1. Field of the Invention

This invention relates to a control system for a compression-ignition internal combustion engine.

2. Description of the Related Art

Gasoline-fueled internal combustion engines known as "compression auto-ignition" or "compression-ignition" engines have emerged in various types in recent years. As taught by Japanese Laid-Open Patent Application No. 2000-87749, in certain operating regions these engines use compression-ignition, i.e., ignition in which the air-fuel mixture supplied to the combustion chamber auto-ignites and burns as a result of being compressed by the piston (sometimes called "Homogeneous Charge Compression-Ignition (HCCI)"), and in other operating regions they use spark-ignition, i.e., ignition in which the air-fuel mixture is ignited to burn by a spark plug. These engines can realize better thermal efficiency and fuel consumption performance than ordinary spark-ignition engines because they can achieve higher compression ratios.

The system described in the reference is directed to enabling constant stable operation of a compression-ignition engine by disabling compression-ignition operation when the engine coolant temperature detected by a coolant temperature sensor is lower than a predetermined temperature set as a function of the intake air temperature detected by a temperature sensor.

Although this prior art system determines switching to compression-ignition operation by the engine coolant temperature, there are other factors to be taken into account when switched to compression-ignition operation so as to avoid premature ignition or misfire, thereby enabling to prevent drivability and fuel consumption performance from being affected therefrom.

SUMMARY OF THE INVENTION

An object of this invention is therefore to provide a control system for a compression-ignition engine that prohibits switching to compression-ignition operation in a certain condition so as to avoid premature ignition and misfire, thereby enabling to prevent drivability and fuel consumption performance from being affected therefrom.

In order to achieve the object, this invention provides a system for controlling an internal combustion engine whose operation is switchable between a compression-ignition operation in which an air-fuel mixture supplied to a combustion chamber auto-ignites to burn owing to compression and a spark-ignition operation in which the air-fuel mixture is ignited to burn by a spark of a spark plug installed in the combustion chamber, comprising: a prohibitive condition determiner that determines whether a predetermined prohibitive condition to prohibit switching from the spark-ignition to the compression-ignition operation is satisfied; and a switching prohibiter that prohibits switching from the spark-ignition operation to the compression-ignition operation when the predetermined prohibitive condition is satisfied.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

A control system for a compression-ignition engine according to preferred embodiments of the present invention will now be explained with reference to the attached drawings.

Figure 1:
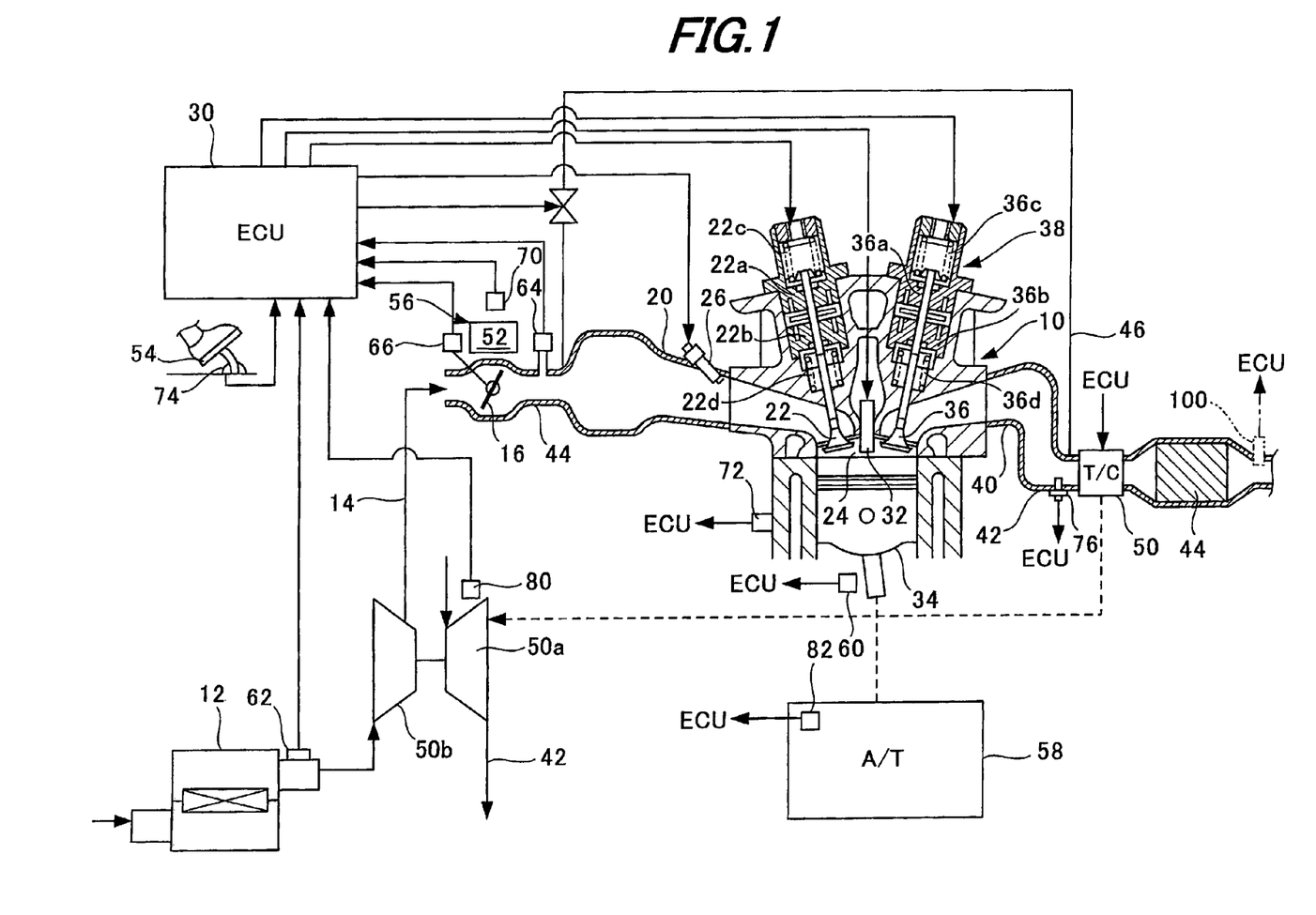
FIG. 1 is an overall schematic view of the control system for a compression-ignition engine according to a preferred embodiment of the invention.

FIG. 1 is an overall schematic view of the control system for a compression-ignition engine according to the preferred embodiment of the invention.

Symbol 10 in FIG. 1 designates a four-cylinder, four-cycle internal combustion engine (only one cylinder shown) that uses gasoline for fuel. In the engine 10, air drawn in through an air cleaner 12 flows through an air intake pipe 14 and, under flow-rate regulation by a throttle valve 16, passes through an intake manifold 20 into a combustion chamber 24 when two intake valves (only one shown) 22 open.

A fuel injector 26 is installed near an intake port upstream of the intake valves 22. The injector 26 is supplied with pressurized gasoline fuel from a fuel tank (not shown) through a fuel line (not shown). The injector 26 is connected through a drive circuit (not shown) to an ECU (Electronic Control Unit) 30.

Upon receiving a drive signal indicating valve opening time from the ECU 30 via the drive circuit, the injector 26 opens to inject gasoline fuel into the intake port in accordance with the valve opening time. The injected gasoline fuel mixes with the inflowing air to form an air-fuel mixture (premixed air-fuel mixture) that flows into the combustion chamber when the intake valves 22 open.

A spark plug 32 is installed in the combustion chamber 24. The spark plug 32 is connected to the ECU 30 through an igniter or other such ignition device (not shown). Upon receiving an ignition signal from the ECU 30, the spark plug 32 produces a spark discharge between electrodes facing into the combustion chamber. The spark discharge ignites the air-fuel mixture, which burns explosively to drive a piston 34 downward.

The engine 10 is constituted as a compression-ignition internal combustion engine that, depending on the operating region, can be switched between operation using compression-ignition (homogeneous charge compression-ignition) that auto-ignites to burn the air-fuel mixture by compression and spark-ignition that uses the spark plug 32 etc. to ignite to burn the air-fuel mixture.

The exhaust gas produced by the combustion flows into an exhaust manifold 40 when two exhaust valves (only one shown) 36 open.

Each exhaust valve 36 (and intake valve 22) is equipped on its stem with a valve-closing magnetic solenoid 36a (22a), a valve-opening magnetic solenoid 36b (22b), a spring 36c (22c), and a spring 36d (22d). The exhaust and intake valves are thus constituted as magnetic solenoid valves operated by the magnet forces of the solenoids 36a, 22a, 36b and 22b. The exhaust valve 36 (and intake valve 22) is closed by energizing the valve-closing magnetic solenoid 36a (22a) and de-energizing the valve-opening magnetic solenoid 36b (22b) and is opened by de-energizing the valve-closing magnetic solenoid 36a (22a) and energizing the valve-opening magnetic solenoid 36b (22b). Thus the exhaust valves 36 and intake valves 22 constitute a variable valve mechanism 38 that by energizing and de-energizing the magnetic solenoids 36a, 22a, 36b and 22b installed therein variably regulates the opening/closing valve timing independently of the rotation angle of a crankshaft (not shown).

The exhaust manifold 40 converges downstream to form an exhaust system confluence section to which an exhaust pipe 42 is connected. The exhaust gas flows from the exhaust manifold 40 into the exhaust pipe 42. A three-way catalytic converter 44 is installed in the exhaust pipe (system) 42. When the catalytic converter 44 is activated, it removes HC, CO, NOx and other harmful components from the exhaust gas before discharging it into the atmosphere outside the engine.

The exhaust pipe 42 is connected through an EGR pipe 46 to a point of the air intake pipe 14 shortly downstream of the throttle valve 16. The EGR pipe 46 is equipped with an EGR valve 46a. The EGR valve 46a is electrically connected to the ECU 30 and, when driven, opens the EGR pipe 46 to recirculate part of the exhaust gas to the air intake system, i.e., to conduct the so-called external EGR.

A turbocharger 50 is installed in the exhaust pipe 42 upstream of the catalytic converter 44. As shown schematically in FIG. 1, the turbocharger 50 comprises a turbine 50a disposed in the exhaust pipe 42 and a compressor 50b, which is disposed in the air intake pipe 14 and connected to the turbine 50a. The turbine 50a is rotated by exhaust gas passing through the exhaust pipe 42 and the so-generated torque is transmitted to the compressor 50b to forcibly supply fresh air to the combustion chamber 24, i.e., to conduct supercharging. A variable nozzle (not shown) provided near the turbine 50a regulates the flow rate and velocity of the exhaust gas passing through the impeller (not shown) of the turbine 50a.

The throttle valve 16 disposed in the air intake pipe 14 is moved, i.e., opened and closed by a throttle actuator (stepper motor or the like) 52 connected thereto. More specifically, the throttle valve 16 is not mechanically connected to an accelerator pedal 54 installed on the floor near the operator's seat of the vehicle (not shown) in which the engine 10 is mounted but is moved, i.e., opened and closed by a DBW (Drive By Wire) mechanism 56 independently of the operation of the accelerator pedal 54.

The reciprocating motion of the piston 34 is transmitted through a connecting rod to the crankshaft that is rotated thereby. The engine 10 is connected to an automatic transmission (designated "A/T" in the drawing) 58 having five forward speeds and one reverse. The rotation of the engine 10 is transmitted through the crankshaft to the input of the automatic transmission 58, which transmits it to the driven wheels (not shown) at regulated torque.

A crank angle sensor 60 installed near the crankshaft of the engine 10 produces a cylinder identification signal, a top-dead-center (TDC) signal indicating the crank angle at or near the TDC of each cylinder, and a crank angle signal obtained by subdividing the TDC signal. These outputs are sent to the ECU 30.

The ECU 30 is constituted as a microcomputer equipped with a CPU, ROM, RAM, A/D converter circuit, input/output circuit, and counter (none of which are shown). The ECU 30 inputs the crank angle signal and counts it to calculate or detect the engine speed NE.

An air-flow meter 62 equipped with a temperature detection element is installed near the air cleaner 12. The air-flow meter 62 produces an output or signal proportional to the flow rate (indicative of engine load) Gair and the temperature TA of the air drawn in through the air cleaner 12.

A MAP sensor 64 installed on the air intake pipe 14 downstream of the throttle valve 16 produces an output or signal proportional to the manifold absolute pressure PBA. A throttle opening sensor 66 installed at the throttle valve 16 produces an output or signal proportional to the throttle opening or position TH of the throttle valve 16. A rotary encoder 70 installed at the throttle actuator 52 produces an output or signal proportional to the actuation distance or amount of rotation of the throttle actuator 52.

A coolant temperature sensor 72 installed in the coolant passage (not shown) of the engine 10 produces an output or signal proportional to the engine coolant temperature TW. An accelerator position sensor 74 provided near the accelerator pedal 54 produces an output or signal proportional to the position or depressed amount of the accelerator pedal 54 (indicative of engine load) AP which varies with the amount of accelerator depression by the operator.

A wide-range air/fuel ratio sensor 76 installed in the exhaust system near the downstream end of the confluence section produces an output or signal proportional to the oxygen concentration of the exhaust gas flowing through this section (i.e., proportional to the air/fuel ratio). A variable nozzle position sensor 80 installed near the variable nozzle provided near the turbine 50a of the turbocharger 50 produces an output or signal proportional to the position of the variable turbine nozzle.

An ATF temperature sensor 82 installed at an appropriate point on the oil line for supplying automatic transmission fluid (ATF) to the automatic transmission 58 or on the oil pan (not shown) of the automatic transmission 58 produces an output or signal TATF proportional to the ATF temperature.

The outputs of the aforesaid sensors are sent to the ECU 30. The ECU 30 functions as a control unit that, as explained in more detail below, processes the inputted values in accordance with commands stored in the ROM to conduct control operations, including control for enabling switching from spark-ignition operation to compression-ignition operation.

The operation of the control unit (ECU 30) of FIG. 1 will now be explained.

Figure 2:
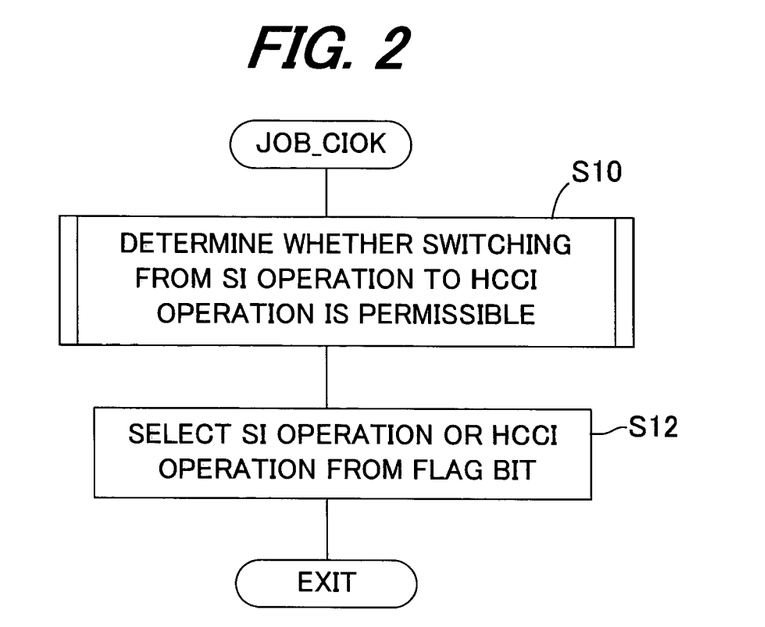
FIG. 2 is a flowchart showing the sequence of operations of the system shown in FIG. 1.

FIG. 2 is a flowchart showing the sequence of operations conducted by the control unit (ECU 30). The illustrated routine is executed at regular intervals (e.g., every 10 milliseconds) on an interrupt basis.

In S10, it is determined whether switching from spark-ignition operation (SI operation) to homogeneous charge compression-ignition operation (HCCI operation) is permissible, in other words it is determined whether a predetermined permissible condition to permit switching from SI operation to HCCI operation is satisfied. Next, in S12, one operating mode between HCCI operation and SI operation is selected in accordance with the result in S10.

During HCCI operation, the temperature inside the combustion chamber 24, i.e., the gas temperature, is required to be around 1,000K. The ECU 30 therefore implements the so-called internal EGR in which the exhaust valves 36 are closed in the course of the exhaust stroke so as not to discharge part of the exhaust gas into the exhaust system but retain it in the combustion chamber 24.

Figure 3:
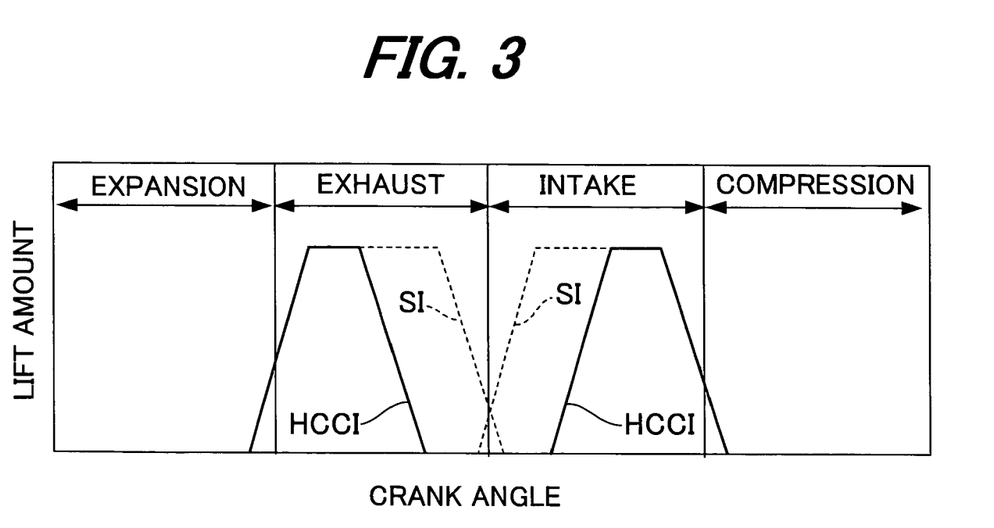
FIG. 3 is a graph showing the characteristics of two valve timings that are switched to each other by a variable valve mechanism of the system shown in FIG. 1.

In other words, the ECU 30 controls the valve timing of the intake valves 22 and exhaust valves 36 as shown by the solid lines in FIG. 3. Specifically, as shown in the drawing, the closing time of the exhaust valves 36 is advanced and the closing time of the intake valves 22 is retarded relative to the crank angle. As a result, a predetermined amount of exhaust gas is retained in the cylinder, thereby raising the internal temperature of the combustion chamber 24, i.e., cylinder internal gas temperature to enable compression-ignition operation.

When the air-fuel mixture is ignited to burn by spark-ignition, the ECU 30 controls the valve timing in accordance with the characteristics indicated by the broken lines. Specifically, as shown in the drawing, the closing time of the exhaust valves 36 and the opening time of the intake valves 22 are both shifted to near the piston top-dead-center. As a result, the closing of the exhaust valves 36 is retarded, thereby increasing the amount of gas discharged from the combustion chamber, and the opening time of the intake valves 22 is advanced so that inflow of intake air starts earlier, thereby discharging the exhaust gas into the exhaust system without retaining any in the combustion chamber.

Thus, since the variable valve mechanism 38 (comprising the exhaust valve 36) regulates the gas temperature in the combustion chamber 24 through the internal EGR when its valve timing is controlled, the mechanism 38 acts as the gas temperature regulator together with the ECU 30 that controls the operation of the mechanism 38. In addition, the DBW mechanism 56 and turbocharger 50 regulates the gas temperature in the combustion chamber 24 by changing the amount of fresh air supplied to the combustion chamber 24 when controlled, they also acts as the gas temperature regulator together with the ECU 30 that controls their operation.

Figure 4:
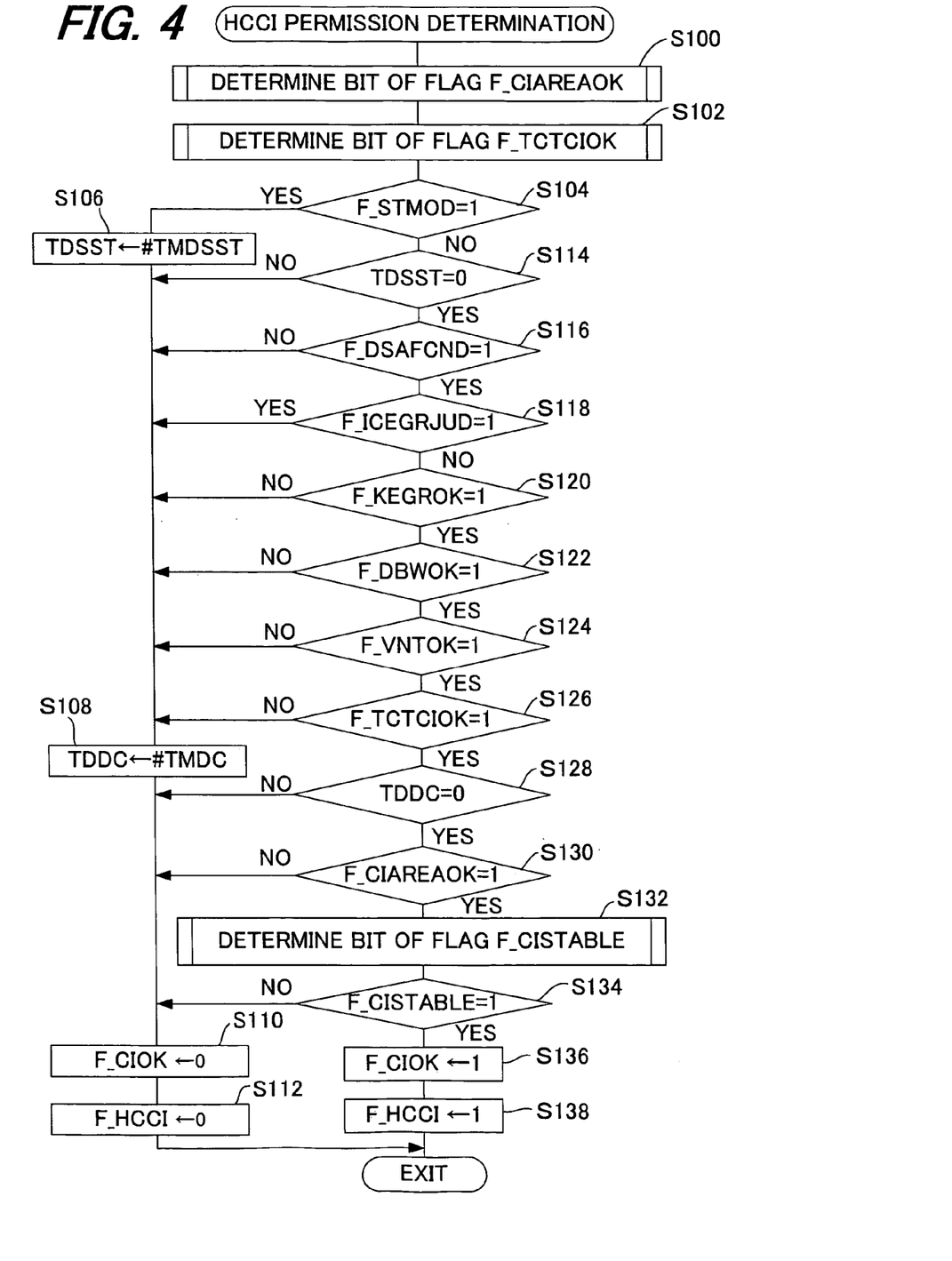
FIG. 4 is a subroutine flowchart of the processing of FIG. 2 for determining whether switching to HCCI operation is permissible.

FIG. 4 is a subroutine flowchart of the processing conducted in S110 of FIG. 2 for determining whether switching to HCCI operation is permissible.

First, in S100, the bit of a flag F_CIAREAOK is determined. The bit of this flag being set to 1 means that the engine operation is in a region in which HCCI operation is possible. The making of the determination in S100 therefore amounts to conducting processing for determining whether a predetermined condition to permit switching from SI operation to HCCI operation is satisfied.

Figure 5:
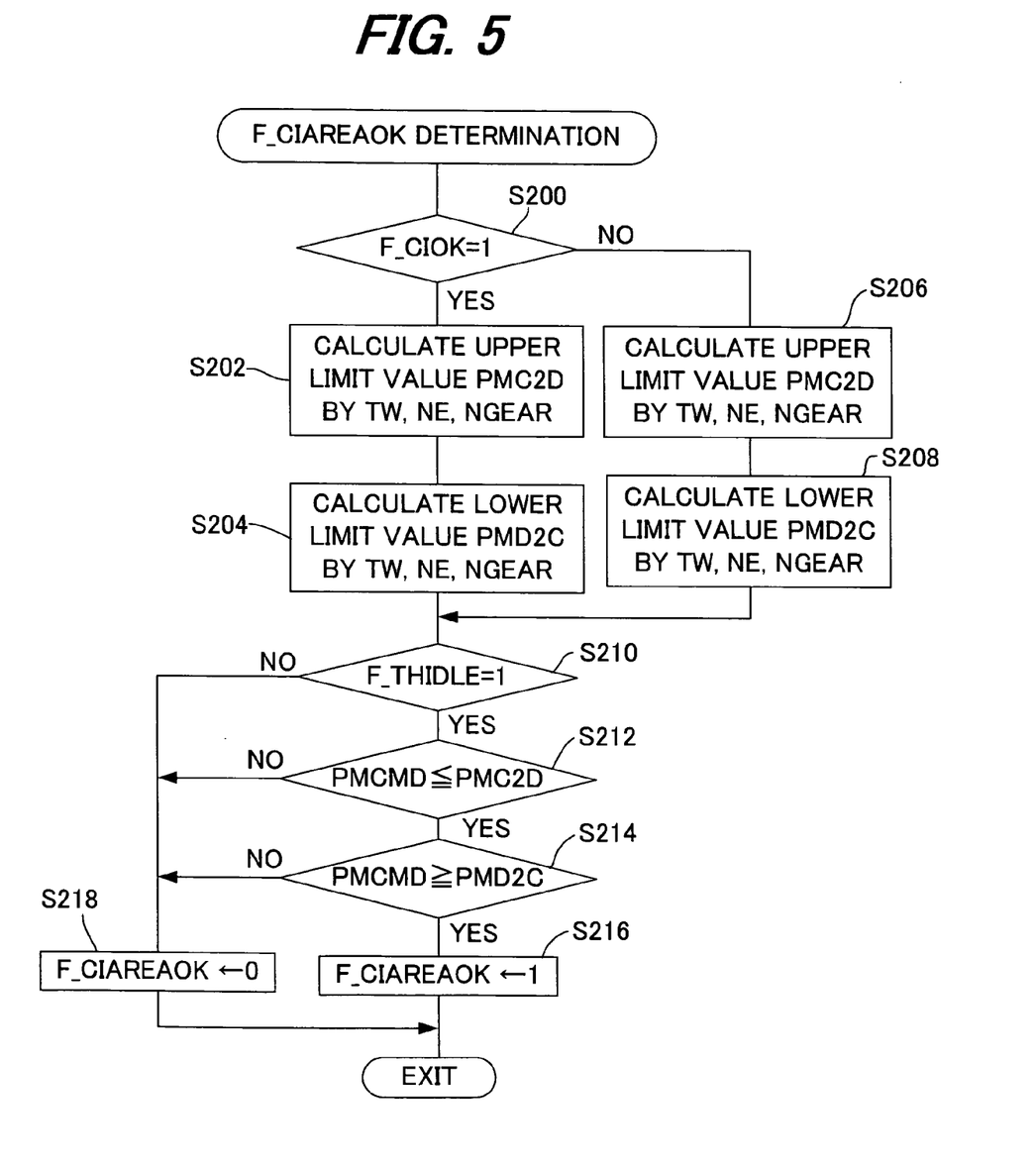
FIG. 5 is a subroutine flowchart of the processing of FIG. 4 for discriminating whether the engine operation is in a region in which HCCI operation is possible.

The subroutine flowchart of FIG. 5 shows the flow of this processing.

In S200, it is determined whether the bit of a flag F_CIOK is set to 1. As explained in more detail later, the bit of this flag being set to 1 means that combustion in HCCI operation is possible. The check here therefore amounts to discriminating whether combustion is possible in HCCI operation.

Figure 6:
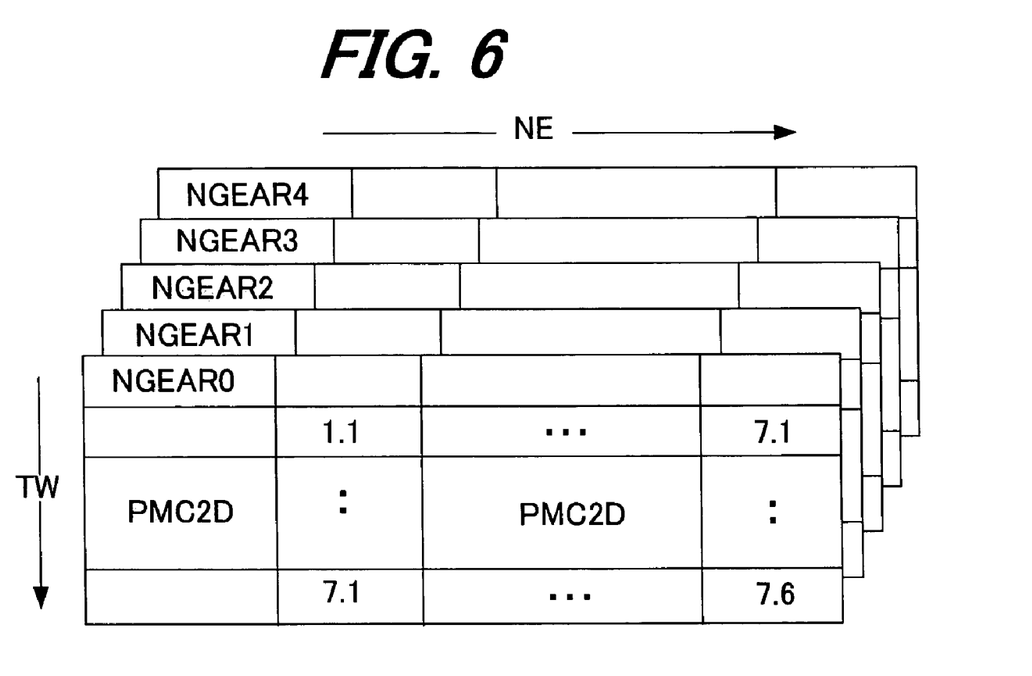
FIG. 6 is an explanatory diagram showing a characteristic of mapped data of the upper limit value of a required torque used in FIG. 5.

When the result in S200 is YES, the program goes to S202, in which the upper limit value PMC2D of the required torque PMCMD is calculated or determined by retrieval from a map using the detected engine coolant temperature (engine temperature) TW, engine speed NE and gear ratio NGEAR now being engaged. FIG. 6 is an explanatory diagram showing the map characteristic of the upper limit value of the required torque.

Since the engine 10 according to this embodiment is controlled by the DBW mechanism 56, the required torque PMCMD is calculated as follows:

$$PMCMD = CONST \cdot PSE/NE$$

In this equation, CONST is a constant. PSE is the power (output) required by or demand on the engine 10 obtained by retrieval from a map (whose characteristics are not shown) predefined based on the accelerator position AP and engine speed NE. PSE is defined to increase with increasing accelerator position AP and increasing engine speed NE.

The upper limit value PMC2D of the required torque PMCMD is defined by subdividing the aforesaid required torque so that it can be retrieved separately for each gear ratio NGEAR now being engaged using the engine coolant temperature TW and engine speed NE. As shown in FIG. 6, for any given gear ratio the upper limit value PMC2D is defined to increase with increasing engine speed NE and engine coolant temperature TW.

The explanation of FIG. 5 will be resumed.

Next, in S204, the lower limit value PMD2C of the required torque is calculated or determined by map retrieval using the simultaneously detected values of the engine coolant temperature TW, engine speed NE and gear ratio NGEAR now being engaged. Although omitted in the drawings, the map characteristic of the lower limit value of the required torque is substantially the same as that shown in FIG. 6.

When the result in S200 is NO, i.e., when it is found that combustion is not possible in HCCI operation, the program goes to S206 and S208, in which the upper limit value PMC2D of the required torque and the lower limit value PMD2C of the required torque are similarly determined by retrieval from maps using the detected engine coolant temperature (engine temperature) TW, engine speed NE and gear ratio NGEAR. Although the map characteristics are omitted in the drawings, they are substantially the same as those shown in FIG. 6. The reason for differentiating between the upper and lower limit values of the required torque depending on whether or not combustion is possible in HCCI operation is to establish hysteresis for preventing degradation of drivability owing to frequent switching back and forth between HCCI operation and SI operation.

Next, in S210, it is determined whether the bit of a flag F_THIDLE is set to 1. The bit of this flag is set to 1 by separate processing not shown in the drawings when the engine 10 is not idling, so that the determination in S210 amounts to discriminating whether the engine 10 is idling.

When the result in S210 is YES, the program goes to S212, in which it is determined whether the determined required torque PMCMD is equal to or less than the required torque upper limit value PMC2D determined in S202 or S206. When the result is YES, the program goes to S214, in which it is determined whether the determined required torque PMCMD is equal to or greater than the required torque lower limit value PMD2C determined in S204 or S208.

When the result in S214 is YES, the program goes to S216, in which the bit of the flag F_CIAREAOK is set to 1 (in other words it is determined that the predetermined permissible condition to permit switching from SI operation to HCCI operation is satisfied). On the other hand, when the result in any of S210 to S214 is NO, the program goes to S218, in which the bit of the flag F_CIAREAOK is set to 0.

As explained above, in the processing of FIG. 5, when it is found that the required torque is between the upper and lower limit values (which are defined differently depending on whether or not combustion is possible in HCCI operation), it is determined that HCCI operation is possible. In other words, the engine 10 is determined to be operating in a region in which HCCI operation is permissible when the operating region is a predetermined one such as the medium- and low-load regions, because HCCI operation is superior to SI operation with regard to NOx reduction and thermal efficiency (fuel consumption performance), but is inferior to SI operation in terms of power output. The idling region is excluded from the low-load region because the required temperature condition is hard to establish in the idling reason so combustion is liable to become unstable.

The explanation of FIG. 4 will be resumed. Next, in S102, a flag F_TCTCIOK (the bit thereof) is determined. The bit of this flag being set to 1 means that the catalytic converter 44 has reached the activated condition following starting of the engine 10, so that this determination amounts to discriminating whether the catalytic converter 44 is in the activated condition, in other words it amounts to determining whether a predetermined permissible condition to permit switching from SI operation to HCCI operation is satisfied.

Figure 7:
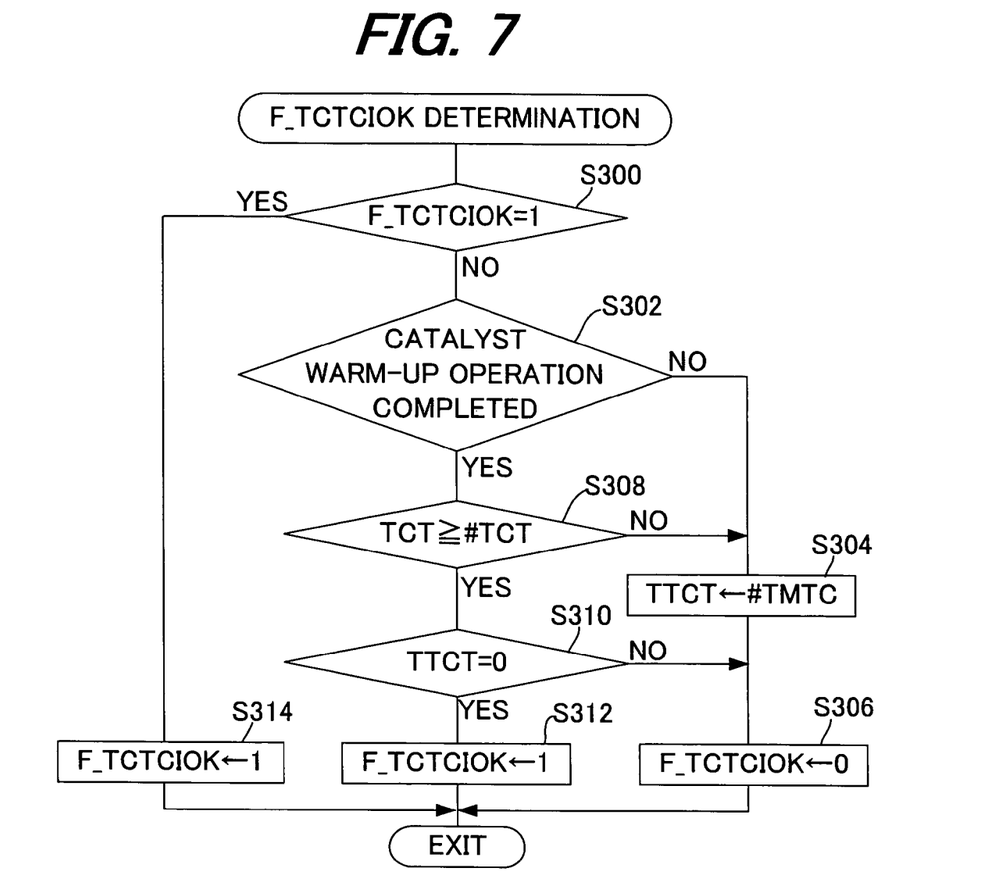
FIG. 7 is a subroutine flowchart of the processing of FIG. 4 for discriminating whether a catalytic converter is in the activated condition.

FIG. 7 is a subroutine flowchart of the processing conducted in S102.

In S300, it is determined whether the bit of the flag F_TCTCIOK is set to 1. The bit of this flag is set to 1 through processing described below, so the result in S300 is ordinarily NO and the program goes to S302, in which it is determined whether catalyst warm-up operation for warming up the catalytic converter 44, more specifically, catalyst warm-up operation for rapidly warming up the catalytic converter 44 after starting of the engine 10, has been completed. The warm-up operation is commenced after the elapse of a predetermined time period, e.g., several seconds, following starting of the engine 10.

When the result in S302 is NO, the program goes to S304, in which a timer (down timer) TTCT is set to a predetermined value #TMTC (between 2 and 3 sec, for example) and time measurement is commenced. Next, in S306, the bit of the flag F_TCTCIOK is reset to 0 and the current cycle of the program is terminated. Also in the next and ensuing cycles, so long as the result in S302 is NO, the predetermined value is reset in S304 and the program then goes to S306.

When the result in S302 becomes YES in a later cycle, the program goes to S308, in which the temperature TCT of the catalytic converter 44 is determined or obtained and compared with a predetermined value (threshold) #TCT to determine whether the determined temperature is equal to or greater than the predetermined value. When the result in S308 is NO, the program goes to S304, in which the timer TTCT is reset to the predetermined value, and then to S306. When the result in S308 is YES, the program goes to S310, in which it is determined whether the value of the timer TTCT has reached 0, i.e., whether a time period corresponding to the predetermined value has passed.

When the result in S310 is NO, the program passes through S306 and terminates. When the result in S310 is YES, the program goes to S312, in which the bit of the flag F_TCTCIOK is set to 1 (in other words it is determined that the predetermined permissible condition to permit switching from SI operation to HCCI operation is satisfied) and then terminates. The bit of this flag being set to 1 means that the catalytic converter 44 is found to be in the activated condition.

In the ensuing cycles, therefore, the result in S300 becomes YES and the program goes to S314, in which the bit of the flag F_TCTCIOK is kept set at 1. In other words, once the bit of this flag has been set to 1 in the processing of FIG. 7, no further determination regarding whether the catalytic converter 44 is in the activated condition is made during the same trip (during driving up to the time the engine 10 is stopped).

The processing for determining the temperature TCT of the catalytic converter 44 mentioned with regard to S308 will now be explained. In this embodiment, the temperature of the catalytic converter 44 is determined not by use of a temperature sensor but by a calculated estimation.

Figure 8:
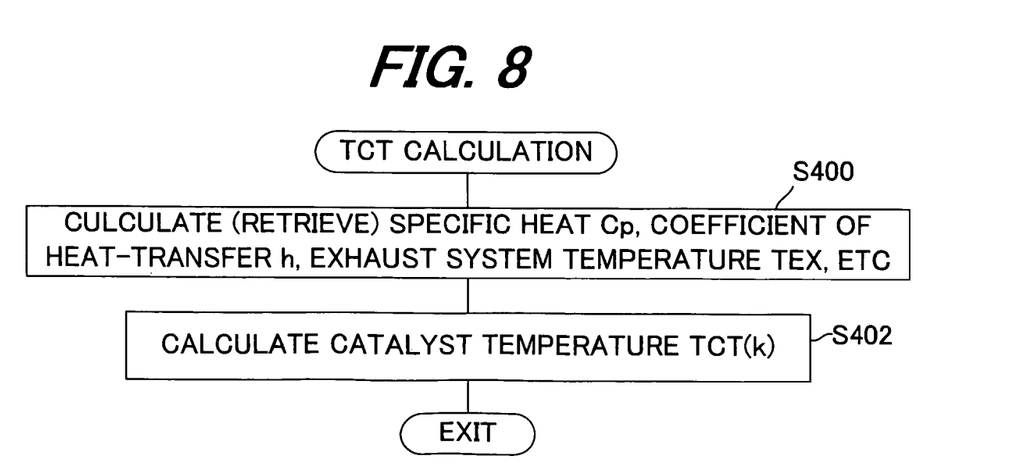
FIG. 8 is a subroutine flowchart of the processing for estimating the temperature of the catalytic converter used in FIG. 7.

This will now be explained. FIG. 8 is a subroutine flowchart showing the steps of the determination. The illustrated program is also activated at predetermined time intervals $\Delta t$ (i.e., every 10 milliseconds as in the case of the program of FIG. 2).

First, in S400, the specific heat Cp [kcal/° C.·kg], heat transfer coefficient h [kcal/m$^2$·° C.·time], exhaust system temperature TEX and the like are calculated by retrieving from maps or tables based on the operating parameters, namely, the engine speed NE, load (accelerator position AP or required torque PMCMD), and desired air/fuel ratio KCMD. The mass m [kg] and cross-sectional area A [m$^2$] of the catalytic converter 44 stored in memory beforehand are read out, whereafter the program goes to S402, in which the catalyst temperature TCT(k) is calculated as shown in FIG. 9, where (k) represents the sample time of the discrete system, specifically the time point of the current program cycle.

The exhaust system temperature TEX has to be corrected for the desired air/fuel ratio KCMD because the amount of energy produced by the engine varies with the air/fuel ratio. However, the correction can be made using the detected air/fuel ratio obtained from the wide-range air/fuel ratio sensor 76 in place of the desired air/fuel ratio KCMD.

An explanation will be made with reference to FIG. 9. In this estimation method, the heat transfer of the catalytic converter 44 is calculated based on a thermodynamic equation and the temperature change thereof is estimated by approximation. In other words, as shown at the top of the drawing, the quantity of heat of the catalytic converter 44, designated QCT, can be estimated from the input exhaust system temperature TEX, and the mass m [kg], specific heat Cp and temperature TCT of the catalytic converter 44.

Figure 9:
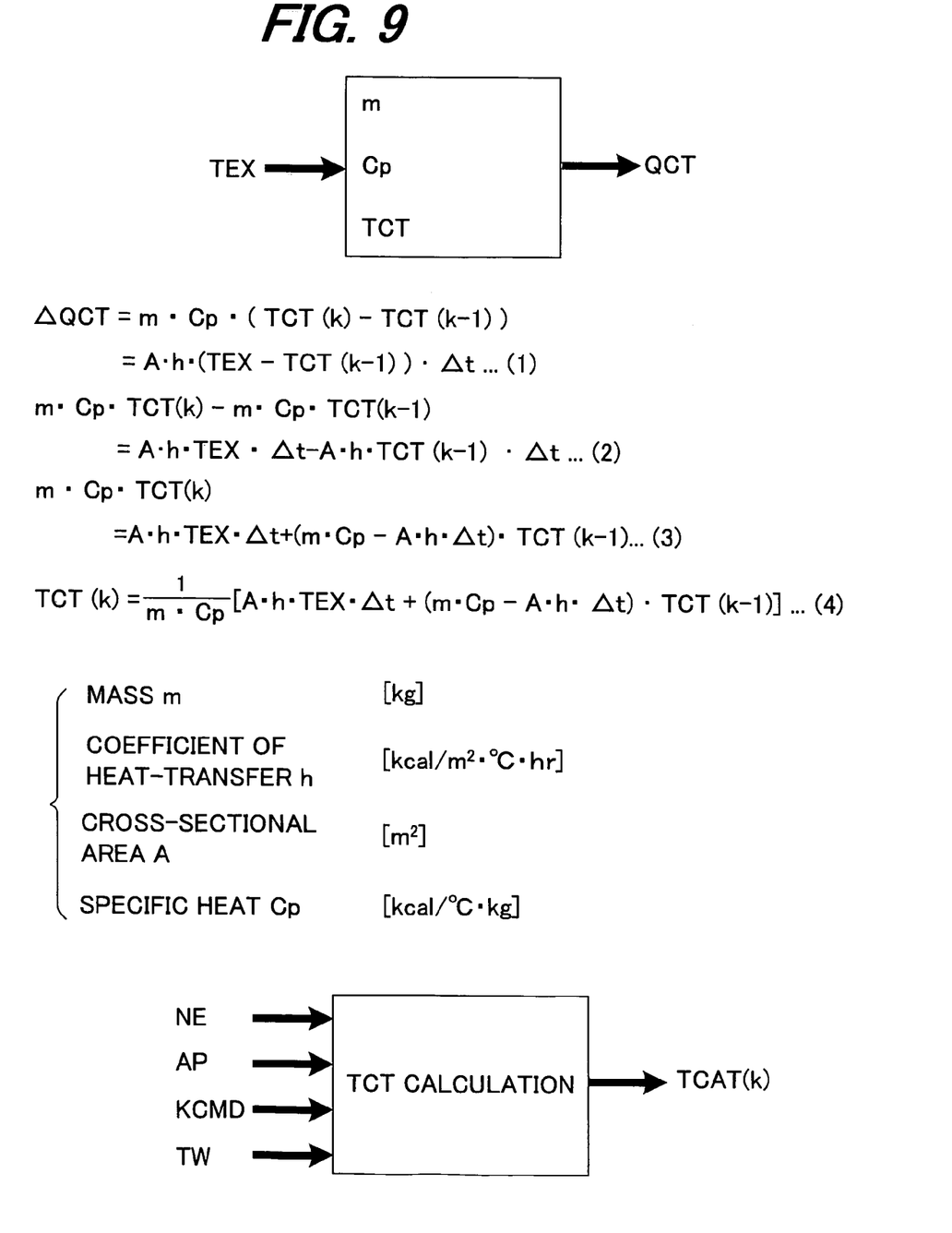
FIG. 9 is a diagram for explaining the processing for estimating the temperature of the catalytic converter shown in FIG. 8.

As shown by Equation (1) in FIG. 9, the quantity of heat input to the catalytic converter 44 during $\Delta t$ seconds (program activation interval), designated $\Delta$QCT, can be approximated as the value obtained by multiplying the difference between the values TCT(k) and TCT(k−1) of the catalyst temperature in the current and preceding cycle by the product of the mass m and specific heat Cp of the catalytic converter 44.

This is equivalent to what is obtained by multiplying the difference between the input exhaust system temperature TEX and the catalyst temperature TCT(k−1) in the preceding cycle by the product of the cross-sectional area A [m²] of the catalytic converter 44 and the heat transfer coefficient h. The right hand side of Equation (1) can therefore be rewritten as Equations (2) and (3), and Equation (4) obtained from Equation (3) can be used to calculate the value TCT(k) of the catalyst temperature in the current cycle. Although Equation (4) is a recurrence formula that requires the initial value of the value TCT(k−1) of the catalyst temperature in the preceding cycle, it suffices to use an appropriate value set in light of the engine coolant temperature TW or the like.

The temperature TCT of the catalytic converter 44 can thus be obtained by computation and estimation. This simplifies the configuration because no temperature sensor is required. Moreover, the adoption of heat balance calculation makes it possible to avoid the problem of detection delay that arises when a sensor is used.

The explanation of the flowchart of FIG. 4 will be continued.

Next, in S104, it is determined whether the bit of a flag F_STMOD is set to 1. The bit of this flag is set to 1 when the engine 10 is in starting mode, so the determination in S104 amounts to determining whether the engine 10 is in starting mode.

When the result in S104 is YES, the program goes to S106, in which a timer (down timer) TDSST is set to a predetermined value #TMDSST (e.g., 2 sec) and time measurement is commenced. Next, in S108, a second timer (down timer) TDDC is set to a predetermined value #TMDC (e.g., 1 sec) and time measurement is commenced. The program then goes to S110, in which the bit of the flag F_CIOK is reset to 0, and to S112, in which the bit of a flag F_HCCI is reset to 0.

The bit of the flag F_HCCI being reset to 0 means that switching from SI operation to HCCI operation is not permitted and the bit thereof being set to 1 means that switching between the modes is permitted. As during idling, switching is prohibited during engine starting because combustion is unstable.

When the result in S104 is NO, the program goes to S114, in which it is determined whether the value of the timer TDSST has reached 0. When the result in S114 is NO, the program goes to S108. When it is YES, the program goes to S116, in which it is determined whether the bit of a flag F_DSAFCND is set to 1. The bit of this flag is set to 1 by separate processing not shown in the drawings when the air/fuel ratio detected by the wide-range air/fuel ratio sensor 76 equals (exactly or approximately) the desired air/fuel ratio KCMD. The determination in S116 therefore amounts to determining whether the detected air/fuel ratio is equal to the desired air/fuel ratio, i.e., whether air/fuel ratio control is normal.

When the result in S116 is NO, it can be concluded that the air/fuel ratio is not sufficiently controlled, so the program goes to S108. When the result is YES, the program goes to S118, in which it is determined whether a flag F_ICEGR-JUD is set to 1. The bit of this flag is set to 1 by separate processing not shown in the drawings when sticking of the throttle valve 16 because of icing or the like causes the deviation between the detected opening of the throttle valve 16 and the desired opening thereof calculated from the electric current applied to the throttle actuator 52 (or the output of the rotary encoder 70 fitted thereon) to reach or exceed a predetermined value. The determination in S118 therefore amounts to determining whether throttle opening control is abnormal, i.e., whether the operation of the DBW mechanism 56 is normal.

When the result in S118 is YES, i.e., when the DBW mechanism 56 is found not to be operating normally, the program goes to S108. When the result is NO, the program goes to S120, in which it is determined whether the bit of a flag F_KEGROK is set to 1. The bit of this flag is set to 1 by separate processing not shown in the drawing when it is found that the deviation between the calculated EGR rate (exhaust gas recirculation rate) KEGR and the desired EGR rate is equal to or less than a predetermined value. The determination in S120 therefore amounts to determining whether the exhaust valves (solenoid valves) 36 for implementing EGR are operating normally.

This will be explained in more detail. As mentioned earlier, the gas temperature in the combustion chamber 24 must be around 1,000 K for HCCI operation. Internal EGR is therefore conducted by closing the exhaust valves 36 in the course of the exhaust stroke so as to retain part of the exhaust gas in the combustion chamber 24 without discharging it into the exhaust system. In this embodiment, the EGR rate KEGR is calculated as follows:

$$KEGR = \text{Gair Fresh}/\text{Gair Charged}$$

"Gair Fresh" is the amount of air drawn in through the air cleaner 12 and detected by the air-flow meter 62. "Gair Charged" is the amount of air corresponding to the basic fuel injection quantity. The basic fuel injection quantity is calculated from the engine speed NE and the manifold absolute pressure PBA, so Gair Charged is also defined as the value calculated from the engine speed NE and manifold absolute pressure PBA.

In other words, the amount of air corresponding to the basic fuel injection quantity required for the current operating condition (i.e., the required amount of air) is calculated and the EGR rate is determined by reverse calculation from the percentage of the required amount of air accounted for by fresh air. In the separate processing referred to above, the bit of the flag F_KEGROK is set to 1 when the deviation between the so-calculated EGR rate KEGR and the desired EGR rate is found to be equal to or less than a predetermined value, i.e., when the operation of the exhaust valves 36 for implementing EGR is found to be normal.

When the result in S120 is NO, i.e., when it is found that the operation of the exhaust valves 36 for implementing EGR is not normal, the program goes to S108. When the result is YES, the program goes to S122, in which it is determined whether the bit of a flag F_DBWOK is set to 1. The bit of this flag is set to 1 by separate processing (not shown) similar to that of S118 when it is found that the operation of the throttle actuator 52 is abnormal, more exactly when it is found that the difference between the amount of actuation calculated from the current command value for the throttle actuator 52 and the amount of actuation (amount of rotation) of the throttle actuator 52 calculated from the output of the rotary encoder 70 is less than a certain value. The determination in S122 therefore amounts to determining whether the throttle actuator 52, i.e., the DBW mechanism 56, is normal.

When the result in S122 is NO, i.e., when it is found that the DBW mechanism 56 is not normal, the program goes to S108. When the result is YES, the program goes to S124, in which it is determined whether the bit of a flag F_VNTOK is set to 1. The bit of this flag is set to 1 by separate processing not shown in the drawings when it is found that the difference between the command value for the variable nozzle installed near the turbine 50a of the turbocharger 50 and the detection value of the variable nozzle position sensor 80 fitted thereon is equal to or less than a predetermined value. The determination in S124 therefore amounts to determining whether the operation of the turbocharger 50, more exactly, the operation of the variable nozzle installed near the turbine 50a, is normal.

When the result in S124 is NO, i.e., when it is found that the operation of the variable nozzle installed near the turbine 50a of the turbocharger 50 is not normal, the program goes to S108. When it is YES, the program goes to S126, in which it is determined whether the bit of the flag F_TCTCIOK is set to 1. The bit of this flag being set to 1 means that the catalytic converter 44 is found to be in activated condition. The determination in S126 therefore amounts to determining whether the catalytic converter 44 is in activated condition, in other words it amounts to determining whether a predetermined condition to permit switching from SI operation to HCCI operation is satisfied.

When the result in S126 is NO, i.e., when it is found that the catalytic converter 44 is not in the activated condition, the program goes to S1108. When it is YES, the program goes to S128, in which it is determined whether the value of the second timer TDDC has reached 0.

When the result in S128 is NO, the program goes to S110. When it is YES, the program goes to S130, in which it is determined whether the bit of the flag F_CIAREAOK is set to 1. The bit of this flag being set to 1 means that it is found that the engine is operating in a region in which HCCI operation is possible. The determination in S130 therefore amounts to determining whether the region is one in which HCCI operation is possible.

When the result in S130 is NO, the program goes to S110. When the result is YES, the program goes to S132, in which a flag F_CISTABLE (the bit thereof) is determined.

Figure 10:
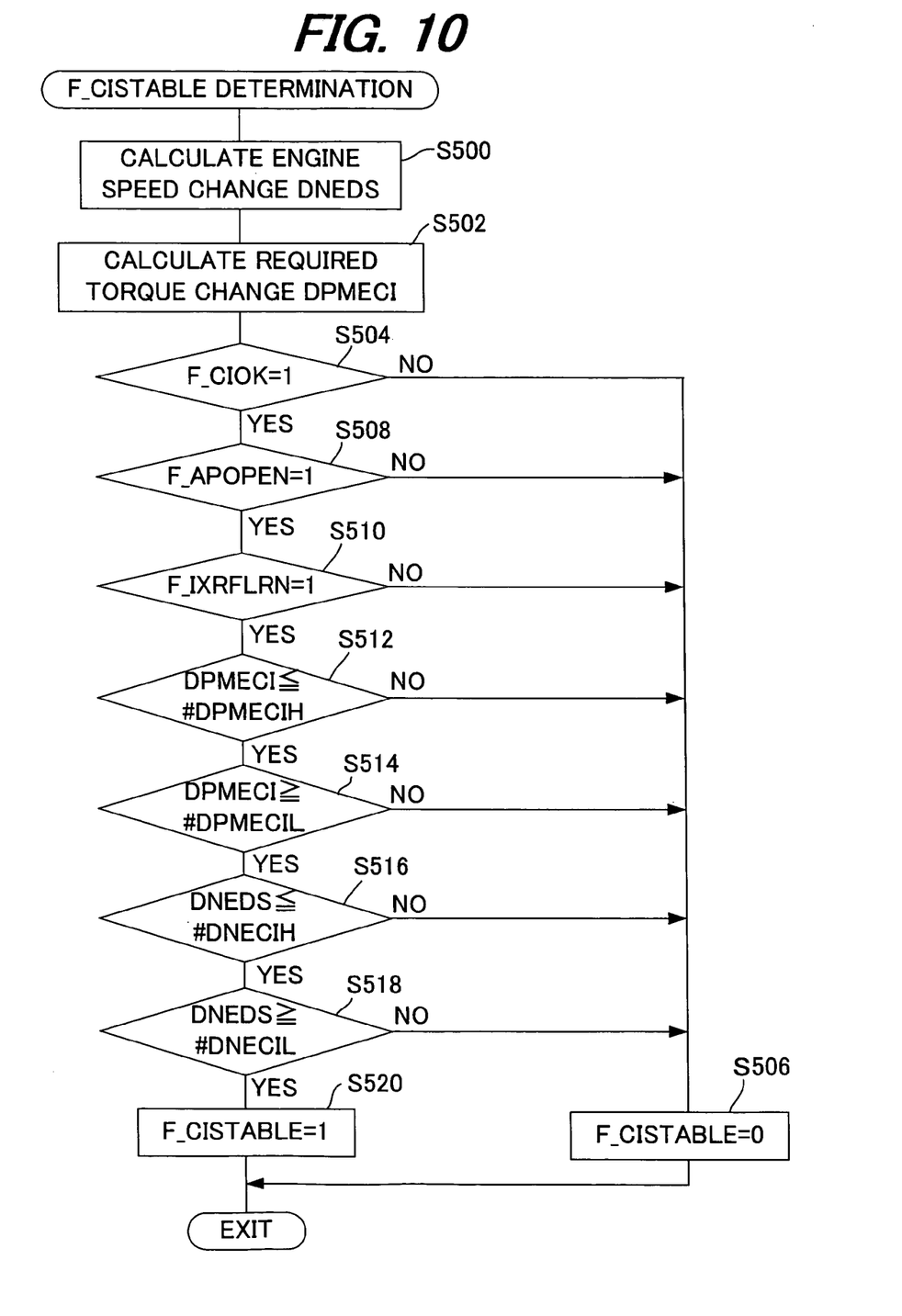
FIG. 10 is a subroutine flowchart of the processing of FIG. 4 for discriminating whether HCCI operation parameters are stable.

This subroutine flowchart of FIG. 10 shows the flow of this processing.

In S500, the change DNEDS in the engine speed NE is calculated. The calculation is done by finding the difference between the values of the engine speed NE in the preceding cycle (value in the preceding cycle of the program of FIG. 2) and the current cycle (value in the current cycle of the program of FIG. 2). Change in the increase direction is specified by a plus sign and in the decrease direction by a minus sign.

Next, in S502, the change DPMECI in the required torque PMCMD is calculated. The calculation is done by finding the difference between the values of the required torque PMCMD in the preceding cycle and the current cycle. Change in the increase direction is specified by a plus sign and in the decrease direction by a minus sign.

Next, in S504, it is determined whether the bit of the flag F_CIOK is set to 1. When the result is NO, i.e., when it has been found that combustion is not possible in HCCI operation, the program goes to S506, in which the bit of the flag F_CISTABLE is reset to 0.

The bit of this flag being reset to 0 means that the HCCI operation parameters are found not to be stable, and the bit thereof being set to 1 means the parameters are found to be stable. The specific purpose of the processing of FIG. 10 is to discriminate whether the required torque PMCMD has changed.

When the result in S504 is YES, the program goes to S508, in which it is determined whether the bit of a flag F_APOPEN is set to 1. This flag is set to 1 by separate processing not shown in the drawings when the accelerator position AP is equal to or greater than a predetermined value (e.g., about 0 degree). This determination therefore amounts to determining whether the accelerator pedal 54 is depressed.

When the result in S508 is NO, i.e., when the bit of the flag F_APOPEN does not indicate change in required torque, the program goes to S506. When the result is YES, the program goes to S510, in which it is determined whether the bit of a flag F_IXRFLRN is set to 1. This flag is set to 1 in separate processing not shown in the drawings when a learned value of the required torque during idling has been calculated.

When the result in S510 is NO, i.e., when the learned value has not been calculated, the program goes to S506. When the result is YES, the program goes to S512, in which, in the case where the value calculated in S502 is the required torque change in increase direction DPMECI, the calculated required torque change DPMECI is compared with a first predetermined value #DPMECIH (positive value) to determine whether the calculated required torque change DPMECI is equal to or less than the first predetermined value.

When the result in S512 is NO, the program goes to S506. When the result is YES, the program goes to S514. The same also applies when no required torque change in increase direction DPMECI has been calculated in S502.

In S514, in the case where the value calculated in S502 is the required torque change in decrease direction DPMECI, the calculated required torque change DPMECI is compared with a second predetermined value #DPMECIL (negative value) to determine whether the calculated required torque change DPMECI is equal to or greater than the second predetermined value (not larger than the second predetermined value in absolute value).

When the result in S514 is NO, the program goes to S506. When the result is YES, the program goes to S516. The same also applies when no required torque change in decrease direction DPMECI has been calculated in S502.

The first predetermined value #DPMECIH (positive value) and second predetermined value #DPMECIL (negative value) are defined so that in absolute value #DPMECIH>#DPMECIL, i.e., they are defined to have different absolute values.

The reason for this is as follows. Change in the gas temperature in the combustion chamber 24 is more gradual in the decrease (falling temperature) direction than in the increase (rising temperature) direction. This means that for any given change in the absolute value of the required torque PMCMD, the gas temperature will be able to follow it if the change is in the decrease direction. Therefore, if different predetermined values are assigned depending on the direction of required torque change, cases will arise in which prohibition of switching to HCCI operation will not arise. At such times, HCCI operation can be implemented to reduce NOx and enhance thermal efficiency and fuel consumption performance, while also avoiding premature ignition and misfire.

As touched on again later, the effect of going to S506 and resetting the bit of the flag F_CISTABLE to 0 is to prohibit HCCI operation. So, in other words, the essence of the processing of S512 and S514 is to prohibit switching from SI operation to HCCI operation when it is found that the calculated required torque change exceeds either the first or second predetermined value.

In S516, in the case where the value calculated in S500 is the engine speed change in increase direction DNEDS, the calculated change DNEDS is compared with a first predetermined value #DNECIH (positive value) to determine whether the calculated change DNEDS is equal to or less than the first predetermined value.

When the result in S516 is NO, the program goes to S506. When the result is YES, the program goes to S518. The same also applies when no engine speed change in increase direction DNEDS has been calculated in S500.

In S518, in the case where the value calculated in S500 is the engine speed change in decrease direction DNEDS, the calculated change DNEDS is compared with a second predetermined value #DNECIL (negative value) to determine whether the calculated change DNEDS is equal to or greater than the second predetermined value (not larger than the second predetermined value in absolute value).

When the result in S518 is NO, the program goes to S506. When the result is YES, the program goes to S520, in which the bit of the flag F_CISTABLE is set to 1. The same also applies when no engine speed change in decrease direction DNEDS has been calculated in S500.

The first predetermined value #DNECIH (positive value) and second predetermined value #DNECIL (negative value) are defined so that in absolute value #DNECIH>#DNECIL, i.e., they are defined to have different absolute values. This is for the same reason as explained with regard to the required torque.

The explanation of FIG. 4 will be resumed.

Next, in S134, it is determined whether the bit of the flag F_CISTABLE is set to 1. When the result is YES, the program goes to S136, in which the bit of the flag F_CIOK is set to 1, and to S138 in which the bit of the flag F_HCCI is set to 1, thereby enabling switching from SI operation to HCCI operation.

When the result in S134 is NO, the program goes to S110, in which the bit of the flag F_CIOK is reset to 0, and to S112, in which the bit of the flag F_HCCI is reset to 0, thereby prohibiting switching from SI operation to HCCI operation.

In the processing of S12 of FIG. 2, SI operation mode is selected when the bit of the flag F_HCCI is reset to 0. When it is set to 1, HCCI operation mode is selected (In other words the switching from SI operation to HCCI operation is permitted when the predetermined condition is satisfied). In response to the selection of the operating mode, the ECU 30 controls the timings of the intake valves 22 and exhaust valves 36 in accordance with the characteristics shown in FIG. 3.

As set out in the foregoing, in the present embodiment, it is determined whether a predetermined prohibitive condition is satisfied, and the switching from the SI operation to the HCCI operation is prohibited when the predetermined prohibitive condition is satisfied. Specifically, it is discriminated whether the operation of the gas temperature regulator is normal, and the switching from SI operation to HCCI operation is prohibited when it is discriminated that the operation of the gas temperature regulator is discriminated to be not normal. Owing to this configuration, it becomes possible to avoid premature ignition and misfire, thereby enabling to prevent drivability and fuel consumption efficient from being affected from the premature ignition and misfire.

In addition, since the gas temperature regulator comprises the variable valve mechanism 38 that closes the exhaust valve 36 in a course of exhaust stroke so as to retain part of exhaust gas in the combustion chamber 24 during the compression-ignition operation, or the DBW mechanism 56 that includes the actuator 52 which moves the throttle valve 16 installed in the engine independently of operation of the accelerator pedal 54, or the turbocharger 50 that forcibly supplies fresh air to the combustion chamber 24, and the switching from SI operation to HCCI operation is prohibited when the operation is discriminated to be not normal, it becomes possible to securely avoid premature ignition and misfire, thereby enabling to securely prevent drivability and fuel consumption efficient from being affected from the premature ignition and misfire.

Further, the required torque change DPMECI is calculated to be compared with the predetermined values #DPMECIH, #DPMECIL, and the switching from SI operation to HCCI operation is prohibited when required torque change exceeds the predetermined value. Owing to this configuration, it becomes possible to avoid premature ignition and misfire, thereby enabling to prevent drivability and fuel consumption efficient from being affected from the premature ignition and misfire.

In addition, the first value #DPMECIH and the second value #DPMECIL of the predetermined values are defined to be different from each other depending on the direction of the calculated change, more precisely are defined to be #DPMECIH>#DPMECIL. Owing to this configuration, it becomes possible to determine to prohibit switching from SI operation to HCCI operation more appropriately.

This is because change in the gas temperature in the combustion chamber 24 is more gradual in the decrease (falling temperature) direction than in the increase (rising temperature) direction. This means that for any given change in the absolute value of the required torque PMCMD, the gas temperature will be able to follow it if the change is in the decrease direction. Therefore, if different predetermined values are assigned depending on the direction of required torque change, cases will arise in which prohibition of switching to HCCI operation will not arise. At such times, HCCI operation can be implemented to reduce NOx and enhance thermal efficiency and fuel consumption performance, while also avoiding premature ignition and misfire.

Figure 11:
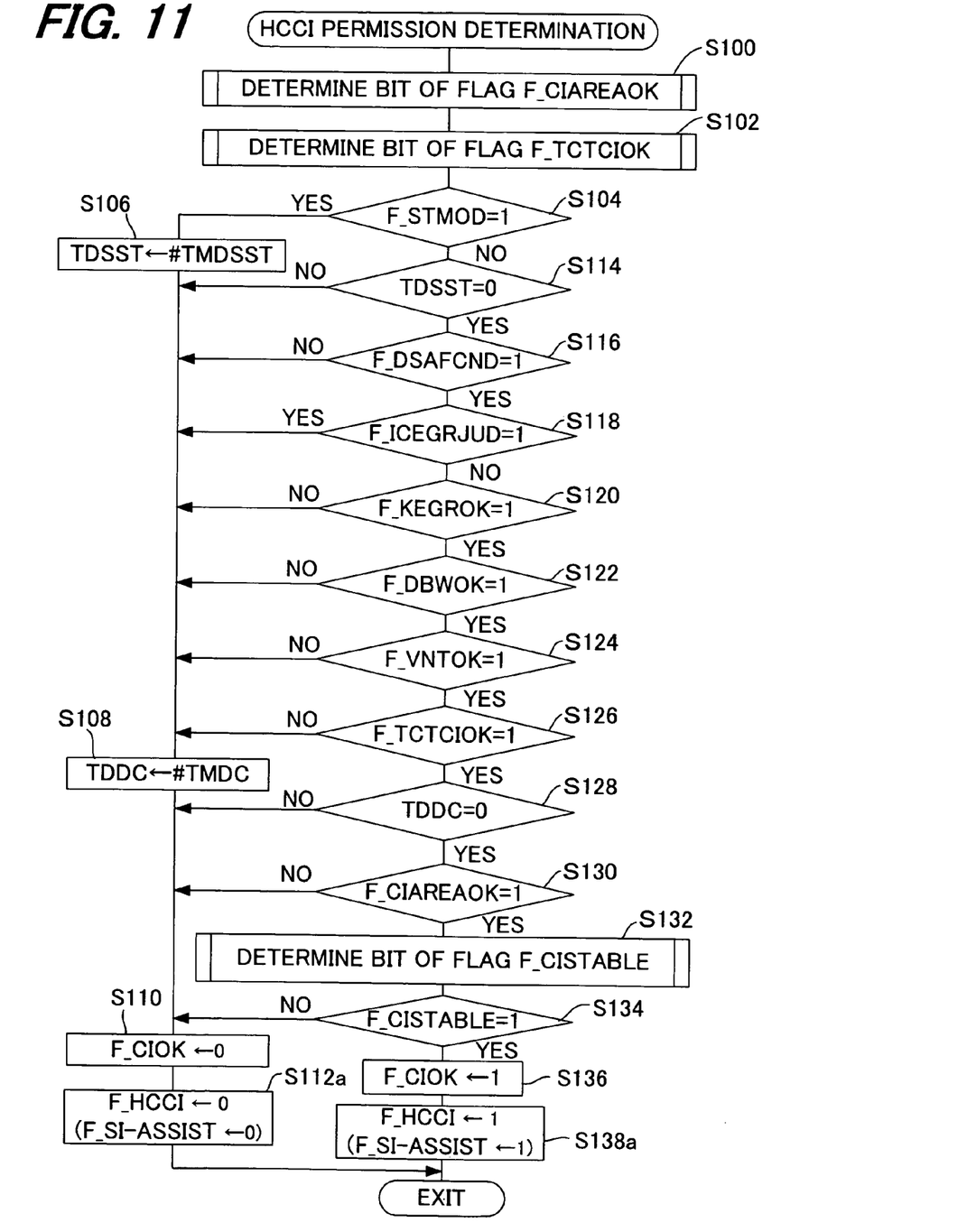
FIG. 11 is a view, similar to FIG. 4, but showing a control system for a compression-ignition engine according to a second embodiment of the invention.

FIG. 11 is a view, similar to FIG. 4, but showing the operation of the control system for a compression-ignition engine according to a second embodiment of the invention.

Explaining the figure with focus on the difference from the first embodiment, when it is determined in S134 that the bit of the flag F_CISTABLE is set to 1, the program goes to S136, in which the bit of the flag F_CIOK is set to 1, and to S138a in which the bit of the flag F_HCCI is set to 1, thereby enabling switching from SI operation to HCCI operation. In addition, the bit of another flag F_SI-ASSIST is set to 1 in S138a.

The bit of this flag being set to 1 means that the spark plug 32 is additionally ignited at the end of HCCI operation, i.e., at the end of the compression stroke, when HCCI operation is selected in S12 of FIG. 2. This spark ignition by the spark plug 32 is used as an assist in HCCI operation. HCCI operation can assure stable combustion in the first embodiment. However, in the second embodiment, spark ignition is added at the end of HCCI operation so as to achieve more stable combustion. It should therefore be noted that the HCCI operation assisted by spark ignition in the second embodiment is still different from SI operation.

When the result in S134 is NO, the program goes to S110, in which the bit of the flag F_CIOK is reset to 0, and to S112a, in which the bit of the flag F_HCCI is reset to 0, thereby prohibiting switching from SI operation to HCCI operation. In S112a, the bit of the flag F_SI-ASSIST is also reset to 0.

With this in the second embodiment, it becomes possible to assure more stable combustion in HCCI operation. The rest of configuration and effects are the same as those of the first embodiment.

The first to second embodiments are configured to have a system for controlling an internal combustion engine (10)

whose operation is switchable between a compression-ignition (more precisely homogeneous charge compression-ignition (HCCI)) operation in which an air-fuel mixture supplied to a combustion chamber (24) auto-ignites to burn owing to compression and a spark-ignition (SI) operation in which the air-fuel mixture is ignited to burn by a spark of a spark plug (32) installed in the combustion chamber, comprising: a prohibitive condition determiner (ECU 30, S10, S118 to S124, S132, S500, S502, S512 to S518) that determines whether a predetermined prohibitive condition to prohibit switching from the spark-ignition to the compression-ignition operation is satisfied; and a switching prohibiter (ECU 30, S10, S112, S134, S506) that prohibits switching from the spark-ignition operation to the compression-ignition operation when the predetermined prohibitive condition is satisfied.

In the system, the prohibitive condition determiner includes: a gas temperature regulator (38, 56, 50) that regulates a gas temperature in the combustion chamber (24); and a discriminator (ECU 30, S10, S118 to S124) that discriminates whether operation of the gas temperature regulator is normal; and determines that the predetermined prohibitive condition is satisfied when the operation of the gas temperature regulator is discriminated to be not normal (S112).

In the system, the gas temperature regulator comprises a variable valve mechanism (38) that closes an exhaust valve (36) in a course of exhaust stroke so as to retain part of exhaust gas in the combustion chamber (24) during the compression-ignition operation.

In the system, the gas temperature regulator comprises a DBW mechanism (56) that includes an actuator (52) which moves a throttle valve (16) installed in the engine (10) independently of operation of an accelerator pedal (54).

In the system, the gas temperature regulator comprises a turbocharger (50) that forcibly supplies fresh air to the combustion chamber (24).

In the system, the prohibitive condition determiner includes: a required torque change calculator (ECU 30, S10, S132, S502) that calculates a change in a torque required by the engine DPMECI; and a comparator (ECU 30, S512, S514) that compares the calculated change in the required torque DPMECI with a predetermined value #DPMECIH, #DPMECIL; and determines that the predetermined prohibitive condition is satisfied when the calculated change in the required torque exceeds the predetermined value (S506).

In the system, the comparator compares the calculated change DPMECI with a first value of the predetermined value #DPMECIH when the calculated change is a change in increasing direction (S512).

In the system, the comparator compares the calculated change DPMECI with a second value of the predetermined value #DPMECIL when the calculated change is a change in decreasing direction (S514), and the prohibitive condition determiner determines that the predetermined prohibitive condition is satisfied when the calculated change exceeds the second value in absolute value (S506).

In the system, the first value #DPMECIH and the second value #DPMECIL are defined to be different from each other depending on the direction of the calculated change.

In the system, the prohibitive condition determiner includes: an engine speed change calculator (ECU 30, S10, S132, S500) that calculates a change in a speed of the engine DNEDS; and a comparator (ECU 30, S516, S518) that compares the calculated change in the engine speed DNEDS with a predetermined value #DNECIH, #DNECIL; and determines that the predetermined prohibitive condition is satisfied when the calculated change in the engine speed exceeds the predetermined value (S506).

In the system, the comparator compares the calculated change DNEDS with a first value of the predetermined value #DNECIH when the calculated change is a change in increasing direction (S516).

In the system, the comparator compares the calculated change DNEDS with a second value of the predetermined value #DNECIL when the calculated change is a change in decreasing direction (S518), and the prohibitive condition determiner determines that the predetermined prohibitive condition is satisfied when the calculated change exceeds the second value in absolute value (S506).

In the system, the first value #DNECIH and the second value #DNECIL are defined to be different from each other depending on the direction of the calculated change DNEDS.

In the system, the air-fuel mixture supplied to the combustion chamber auto-ignites to burn solely by compression of the combustion chamber (ECU 30, S10, S100 to S138).

In the system, the air-fuel mixture supplied to the combustion chamber auto-ignites to burn by assistance of the spark of the spark plug (32) under compression of the combustion chamber (ECU 30, S10, S100 to S138a).

Although the foregoing embodiments are explained with regard to the case in which internal EGR is conducted during HCCI operation, it is also possible to adopt an arrangement that, in addition to conducting internal EGR, further conducts external EGR in which part of the exhaust gas is recirculated to the air intake system through the EGR pipe 46.

The valve timing characteristics of the intake valves 22 and exhaust valves 36 shown in FIG. 3 are presented solely as non-limitative examples. Moreover, the invention is not limited to the exemplified configuration that variably controls valve timing by constituting the intake valves 22 and exhaust valves 36 as solenoid valves and the variable control can instead be implemented using any of various other configurations.

Although the temperature of the catalytic converter 44 is estimated by calculation in the foregoing embodiment, it is possible instead, as indicated by imaginary lines in FIG. 1, to provide a temperature sensor 100 near the catalytic converter 44 and directly measure the temperature of the catalytic converter 44.

Although the invention is explained taking as an example the engine 10 configured to inject fuel into the intake port upstream of the intake valves 22, the invention can also be applied to a cylinder injection engine that injects fuel directly into the combustion chamber 24.

Japanese Patent Application Nos. 2005-226955 and 2005-226956 both filed on Aug. 4, 2005, are incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling an internal combustion engine whose operation is switchable between a compression-ignition operation in which an air-fuel mixture supplied to a combustion chamber auto-ignites to burn owing to compression and a spark-ignition operation in which the air-fuel mixture is ignited to burn by a spark of a spark plug installed in the combustion chamber, comprising:

a prohibitive condition determiner that determines whether a predetermined prohibitive condition to prohibit switching from the spark-ignition to the compression-ignition operation is satisfied; and a switching prohibiter that prohibits switching from the spark-ignition operation to the compression-ignition operation when the predetermined prohibitive condition is satisfied, wherein the prohibitive condition determiner includes:

a gas temperature regulator that regulates a gas temperature in the combustion chamber; and a discriminator that discriminates whether operation of the gas temperature regulator is normal;

and determines that the predetermined prohibitive condition is satisfied when the operation of the gas temperature regulator is discriminated to be not normal.

2. The system according to claim 1, wherein the gas temperature regulator comprises a variable valve mechanism that closes an exhaust valve in a course of exhaust stroke so as to retain part of exhaust gas in the combustion chamber during the compression-ignition operation.

3. The system according to claim 1, wherein the gas temperature regulator comprises a DBW mechanism that includes an actuator which moves a throttle valve installed in the engine independently of operation of an accelerator pedal.

4. The system according to claim 1, wherein the gas temperature regulator comprises a turbocharger that forcibly supplies fresh air to the combustion chamber.

5. A system for controlling an internal combustion engine whose operation is switchable between a compression-ignition operation in which an air-fuel mixture supplied to a combustion chamber auto-ignites to burn owing to compression and a spark-ignition operation in which the air-fuel mixture is ignited to burn by a spark of a spark plug installed in the combustion chamber, comprising:

a prohibitive condition determiner that determines whether a predetermined prohibitive condition to prohibit switching from the spark-ignition to the compression-ignition operation is satisfied; and a switching prohibiter that prohibits switching from the spark-ignition operation to the compression-ignition operation when the predetermined prohibitive condition is satisfied, wherein the prohibitive condition determiner includes:

a required torque change calculator that calculates a change in a torque required by the engine; and a comparator that compares the calculated change in the required torque with a predetermined value;

and determines that the predetermined prohibitive condition is satisfied when the calculated change in the required torque exceeds the predetermined value.

6. The system according to claim 5, wherein the comparator compares the calculated change with a first value of the predetermined value when the calculated change is a change in increasing direction.

7. The system according to claim 5, wherein the comparator compares the calculated change with a second value of the predetermined value when the calculated change is a change in decreasing direction, and the prohibitive condition determiner determines that the predetermined prohibitive condition is satisfied when the calculated change exceeds the second value in absolute value.

8. The system according to claim 7, wherein the first value and the second value are defined to be different from each other depending on the direction of the calculated change.

9. A system for controlling an internal combustion engine whose operation is switchable between a compression-ignition operation in which an air-fuel mixture supplied to a combustion chamber auto-ignites to burn owing to compression and a spark-ignition operation in which the air-fuel mixture is ignited to burn by a spark of a spark plug installed in the combustion chamber, comprising:

a prohibitive condition determiner that determines whether a predetermined prohibitive condition to prohibit switching from the spark-ignition to the compression-ignition operation is satisfied; and a switching prohibiter that prohibits switching from the spark-ignition operation to the compression-ignition operation when the predetermined prohibitive condition is satisfied wherein the prohibitive condition determiner includes:

an engine speed change calculator that calculates a change in a speed of the engine; and a comparator that compares the calculated change in the engine speed with a predetermined value;

and determines that the predetermined prohibitive condition is satisfied when the calculated change in the engine speed exceeds the predetermined value.

10. The system according to claim 9, wherein the comparator compares the calculated change with a first value of the predetermined value when the calculated change is a change in increasing direction.

11. The system according to claim 9, wherein the comparator compares the calculated change with a second value of the predetermined value when the calculated change is a change in decreasing direction, and the prohibitive condition determiner determines that the predetermined prohibitive condition is satisfied when the calculated change exceeds the second value in absolute value.

12. The system according to claim 11, wherein the first value and the second value are defined to be different from each other depending on the direction of the calculated change.

13. The system according to claim 1, wherein the air-fuel mixture supplied to the combustion chamber auto-ignites to burn solely by compression of the combustion chamber.

14. The system according to claim 1, wherein the air-fuel mixture supplied to the combustion chamber auto-ignites to burn by assistance of the spark of the spark plug under compression of the combustion chamber.

* * * * *